(No Model.) 2 Sheets—Sheet 1.
R. J. RAE.
CHAIN SHACKLE OR COUPLING.
No. 523,441. Patented July 24, 1894.
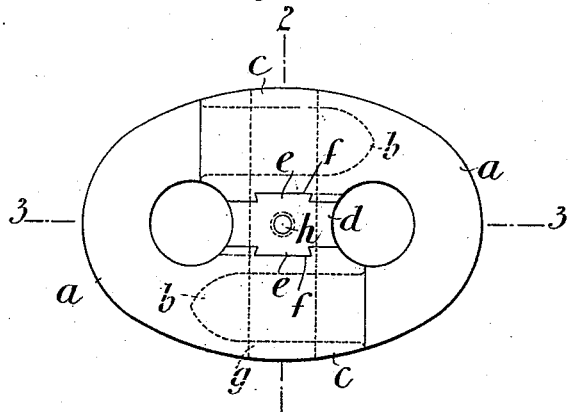
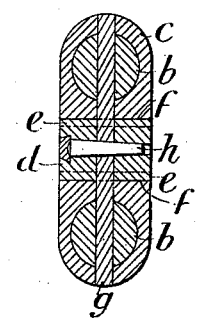
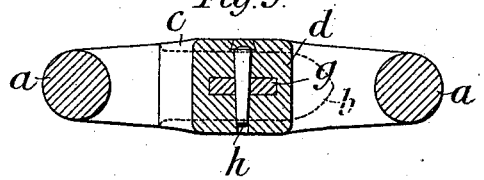
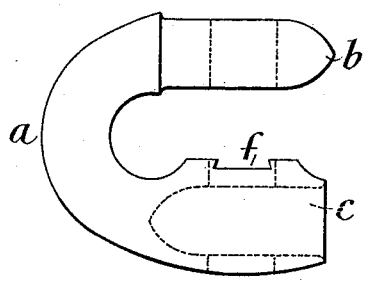
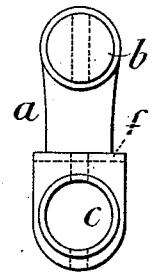
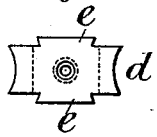
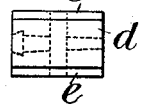
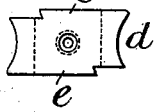
Witnesses
Inventor (No Model.) 2 Sheets—Sheet 2.

R. J. RAE.
CHAIN SHACKLE OR COUPLING.

No. 523,441. Patented July 24, 1894.

Witnesses.
Inventor.

UNITED STATES PATENT OFFICE.

ROBERT JAMES RAE, OF LONDON, ENGLAND.

CHAIN SHACKLE OR COUPLING.

SPECIFICATION forming part of Letters Patent No. 523,441, dated July 24, 1894.

Application filed December 27, 1893. Serial No. 494,849. (No model.) Patented in England December 3, 1888, No. 17,599, and May 24, 1889, No. 8,652; in France December 16, 1893, No. 234,898; in Belgium December 20, 1893, No. 107,739, and in Italy December 31, 1893, XXVIII. 35,434, LXIX, 326.

*To all whom it may concern:*

Be it known that I, ROBERT JAMES RAE, a subject of the Queen of Great Britain, residing at London, England, have invented new and useful Improvements in Chain Shackles or Couplings, (for which I have obtained Letters Patent in the following countries: in Great Britain by Letters Patent No. 17,599, dated December 3, 1888, and No. 8,652, dated May 24, 1889; in France by Letters Patent No. 234,898, dated December 16, 1893; in Belgium by Letters Patent No. 107,739, dated December 20, 1893, and in Italy by Letters Patent, Vol. XXVIII, No. 35,434, Vol. LXIX, No. 326, dated December 31, 1893,) of which the following is a specification.

My invention relates to the construction of chain-shackles or couplings in such a manner that the parts when fitted together have the appearance of an ordinary chain-link so that no impediment is offered to the free passage of the shackle or coupling through a hawse pipe or the like or over a capstan or windlass while at the same time the parts of the coupling can be readily disconnected.

A shackle or coupling constructed according to my invention is composed of two exactly similar main parts adapted to fit one into the other and of a central part or key which serves to lock the two main parts together and at the same time forms the stud for preventing the collapse of the shackle. Each of the main parts is of a U-shape, one arm of the U being in the form of a pin and the other in the form of a socket so that when the two parts are put together the pin of one part will fit into the socket of the other part. The key for preventing the two parts from moving longitudinally relatively with each other or coming asunder and forming the stud of the link is provided with projections or abutments which fit into corresponding recesses formed in the main parts of the shackle.

To enable my invention to be fully understood, I will describe the same by reference to the accompanying drawings, in which—

Figure 9:
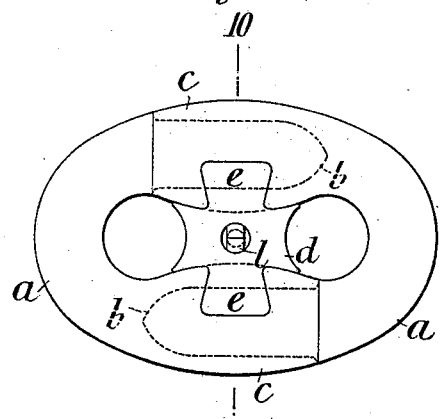
Figure 10:
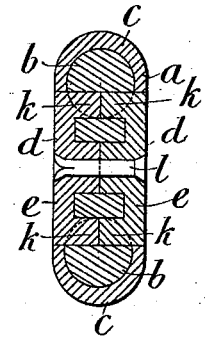
Figure 11:
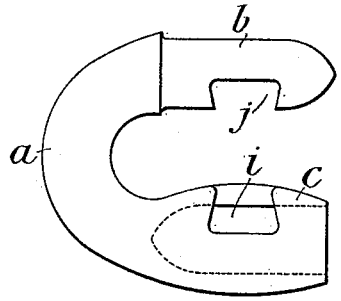
Figure 12:
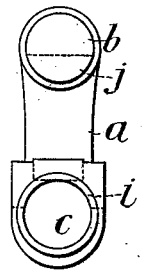
Figure 13:
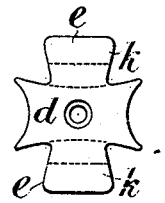
Figure 14:
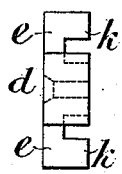
Figure 15:
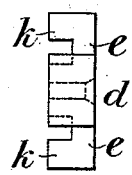
Figure 16:
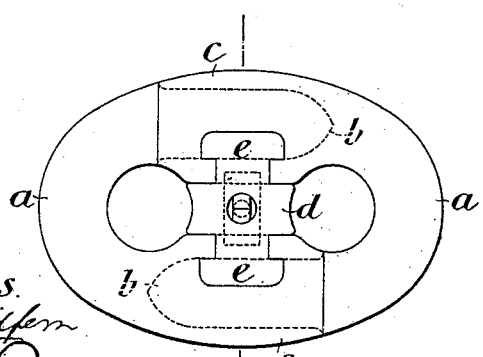
Figure 17:
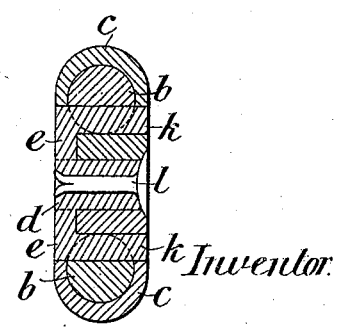

Figure 1 is an elevation of one form of my shackle or coupling; and Figs. 2 and 3 are respectively sections of the same on the lines 2—2 and 3—3, Fig. 1. Figs. 4 and 5 are an elevation and an end view of one of the two main parts of the shackle; and Figs. 6 and 7 are an elevation and end view of the locking-key forming the stud of the link. Fig. 8 is a view showing a modified form of key. Fig. 9 is an elevation of a modified form of link; and Fig. 10 is a section of the same on the line 10—10, Fig. 9. Figs. 11 and 12 are views similar to Figs. 4 and 5 respectively of one of the two main parts of the link shown in Fig. 9; and Figs. 13, 14 and 15 are detail views of the key used with the link shown in Fig. 9. Figs. 16 and 17 illustrate another modification of my invention.

Similar letters of reference indicate corresponding parts in the several figures.

*a, a* are the two main parts of the shackle, *b, b* are the pins thereof, and *c, c* are the sockets, the said pins and sockets being of exactly the same size and shape externally and internally respectively so that when the two parts of the shackle are fitted together they will have the form of an ordinary chain-link.

*d* is the key serving to retain the two parts *a, a* of the shackle together and forming the stud.

In the arrangement of my invention shown in Figs. 1 to 7 the key *d* is provided with two projections *e, e* which fit into corresponding recesses *f, f* formed in the socket portions of the main parts of the shackle. It will be readily understood that when this key is introduced as shown in Fig. 1 it will be impossible for either of the main parts *a, a* to be moved relatively with the other. Any suitable means may be used for holding the key *d* in place. As shown both the pin and socket are slotted as is also the locking-key and a cotter *g* is passed through the coupling from side to side as shown in Fig. 2, a taper pin *h* being introduced through a hole in the locking-key into a corresponding hole in the cotter *g* to prevent the latter from becoming displaced. The said cotter by passing through the pins and sockets not only serves to retain the locking-key in position but also serves to prevent the pins from being pulled out of the sockets under the strains to which the coupling is subjected.

In practice I prefer that the top of the pin

$h$ should be below the surface of the locking-key so that the end may be closed in by means of a plug of lead or other soft metal introduced into an undercut-hole.

The key shown in Fig. 1, and in Figs. 6 and 7, has the projections $e, e$ formed of a dovetail shape, but as the coupling only opens in one direction it is obvious that a key having only a single ledge on each side as shown in Fig. 8 may be used, in which case the recesses $f, f$ are cut away as indicated by the dotted lines in Fig. 1. The dovetail form of projection, however, has the advantage that it tends to prevent the two sides of the coupling from separating under heavy strains.

In the link shown in Figs. 9 to 15 the cotter $g$ is dispensed with, the necessary support being afforded to the pins $b$ in the sockets $c$ by forming slots $i, i$ in the sockets and corresponding recesses $j, j$ in the pins so that lugs $k, k$ formed upon the extended projections $e, e$ of the key will enter the slots and recesses $i, i, j, j$. In this modification the key which has the shape in elevation shown in Fig. 13 is preferably formed in two parts shown in edge view in Figs. 14 and 15, the lugs $k, k$ thereon being of such length that they will meet when placed in position as shown in Fig. 10, and not only serve for retaining the parts in position longitudinally but also serve to hold the parts against transverse displacement. I prefer this divided key as it gives a uniform appearance to the coupling. If desired, however, the lugs $k, k$ may be made so long that when the key is in position upon one side of the coupling the lugs $k, k$ thereof will project through the slots and recesses $i, i, j, j$ so as to be flush with the surface on the other side as shown in Fig. 17. This key which is shown in elevation in Fig. 16 has the projections $e, e$ T-shaped but they may be of a dove-tail shape as in Figs. 9 and 13.

In order that the keys $d$ shown in Figs. 9 to 17 shall not become separated from the links a pin $l$ with a split end may be introduced in each link as shown or a screw or other fastening device may be employed.

Having now particularly described and ascertained the nature of my said invention and in what manner the same is to be performed, I declare that what I claim is—

1. In a chain-shackle or coupling two main parts each provided with a pin and socket adapted to be fitted together with a pin of one part in the socket of the other part and a key having projections engaging in recesses in the said parts and forming a stud for the shackle or coupling, substantially as described.

2. In a chain-shackle or coupling, the combination of two main parts each provided with a pin and socket and adapted to fit together, a locking-key arranged between such parts and forming the stud of the link and a cotter securing the locking-key in position, substantially as described.

3. In a chain-shackle or coupling the combination of two main parts each having a pin and socket and adapted to fit together, and a locking-key formed in two parts and having projecting lugs which enter slots or recesses formed in the pins and the walls of sockets, substantially as, and for the purpose, described.

4. In a chain shackle the combination of two main parts each having a pin provided with a recess and a socket to receive the pin of the other part having its wall provided with a slot and a key having lugs adapted to engage the slots in the wall of said socket and to enter the recesses in said pins when the parts are assembled, substantially as described.

ROBERT JAMES RAE.

Witnesses:
G. F. REDFERN,
JOHN E. BOUSFIELD,
*Of the firm of G. F. Redfern & Co., 4 South Street, Finsbury, London, Patent Agents.*